Dec. 3, 1957 R. E. NORTHUP 2,814,803
JOINING APPARATUS
Filed Dec. 30, 1955 7 Sheets-Sheet 1

INVENTOR.
RUSSELL E. NORTHUP
BY
Attorney

Dec. 3, 1957    R. E. NORTHUP    2,814,803
JOINING APPARATUS
Filed Dec. 30, 1955    7 Sheets-Sheet 2
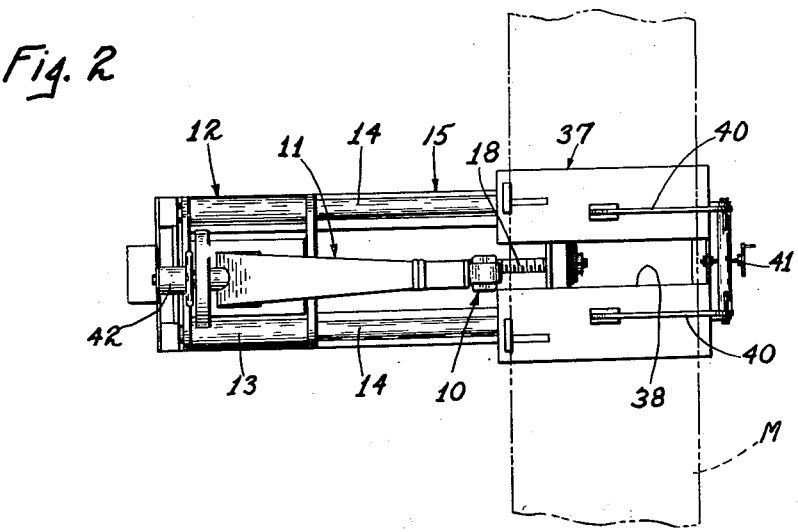
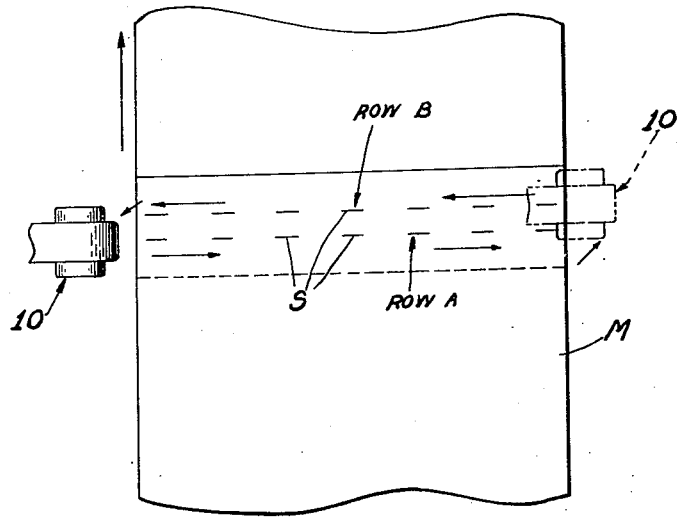
INVENTOR.
RUSSELL E. NORTHUP
BY
ATTORNEY

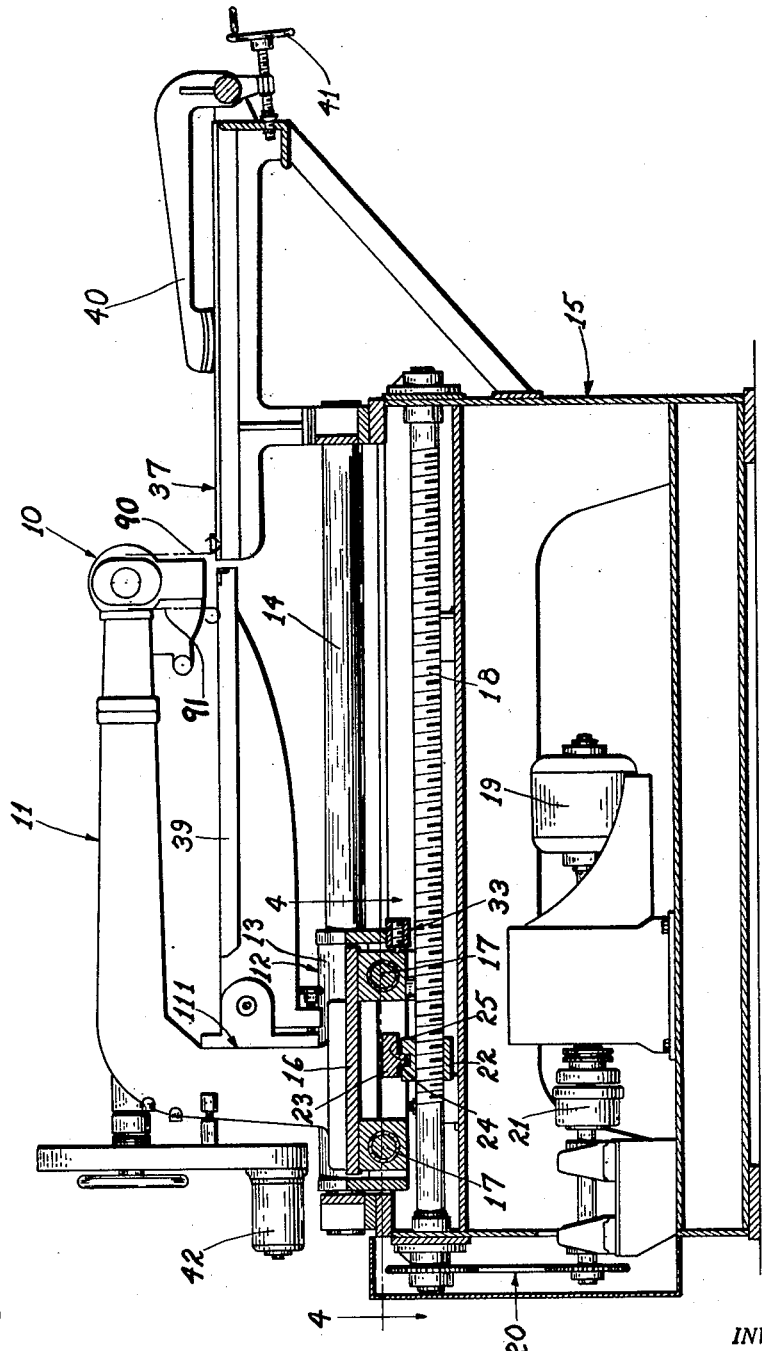

Dec. 3, 1957 R. E. NORTHUP 2,814,803
JOINING APPARATUS
Filed Dec. 30, 1955 7 Sheets-Sheet 4
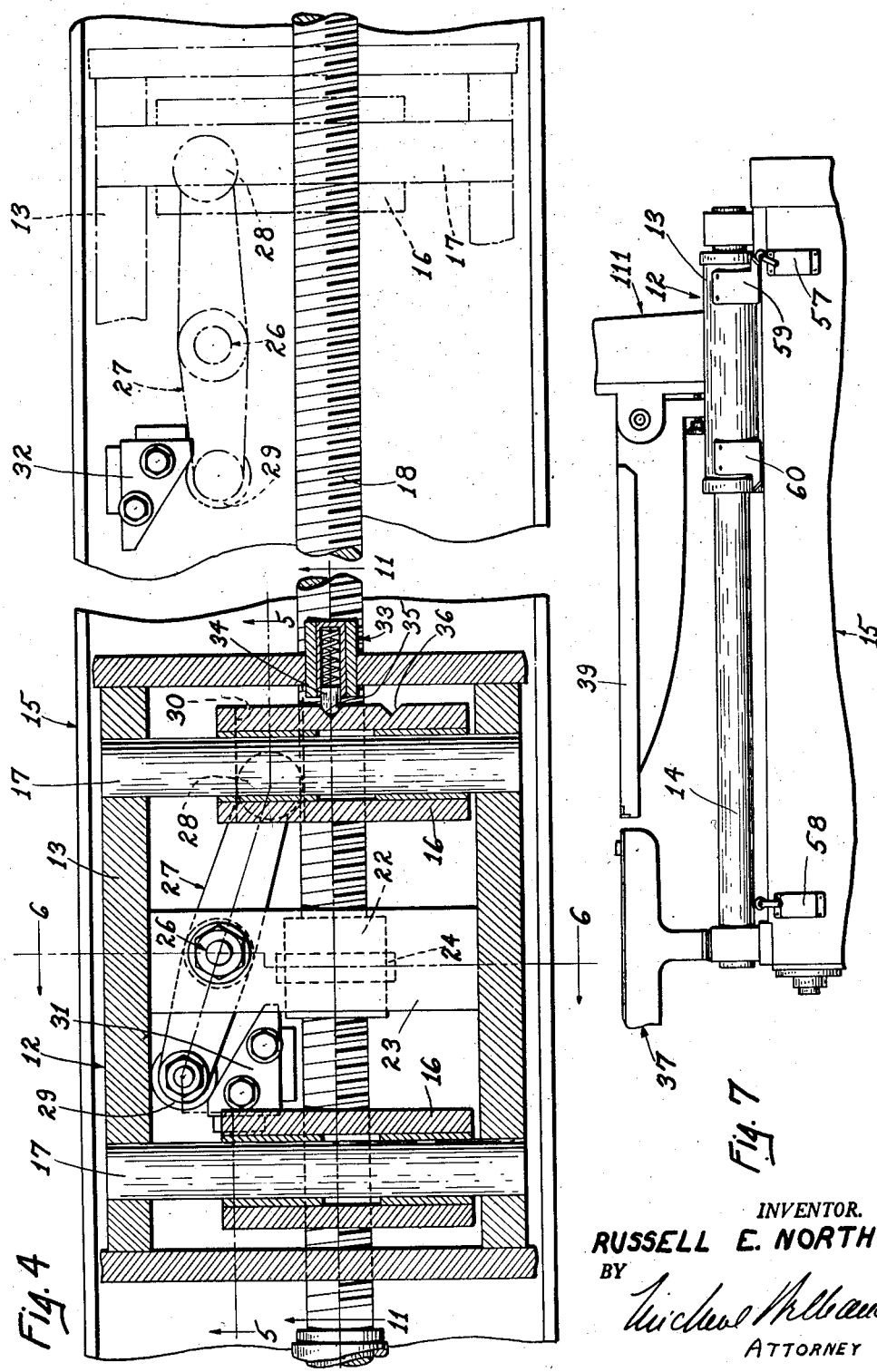
INVENTOR.
RUSSELL E. NORTHUP
BY
ATTORNEY Dec. 3, 1957  R. E. NORTHUP  2,814,803
JOINING APPARATUS
Filed Dec. 30, 1955  7 Sheets-Sheet 6
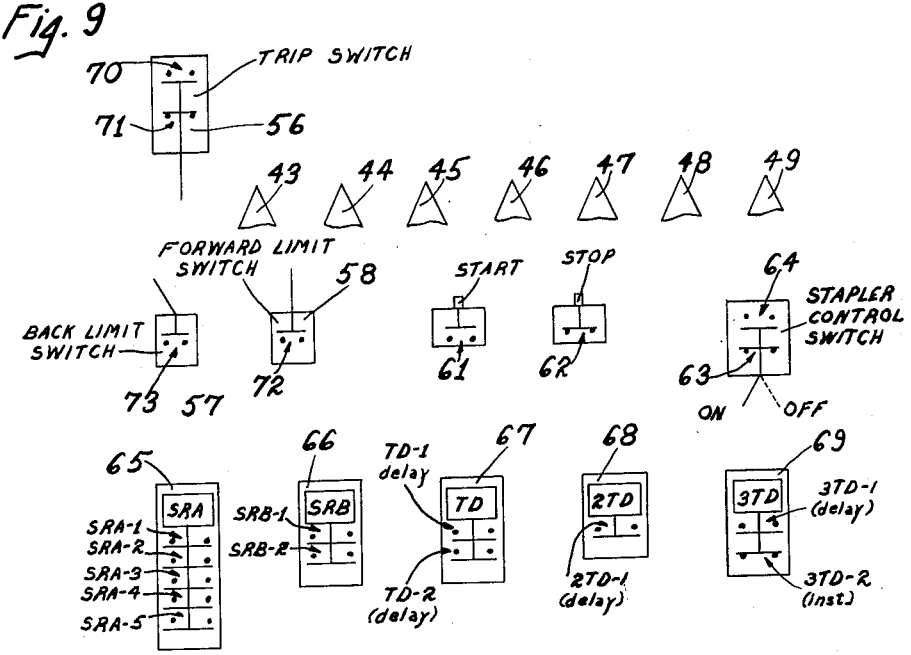
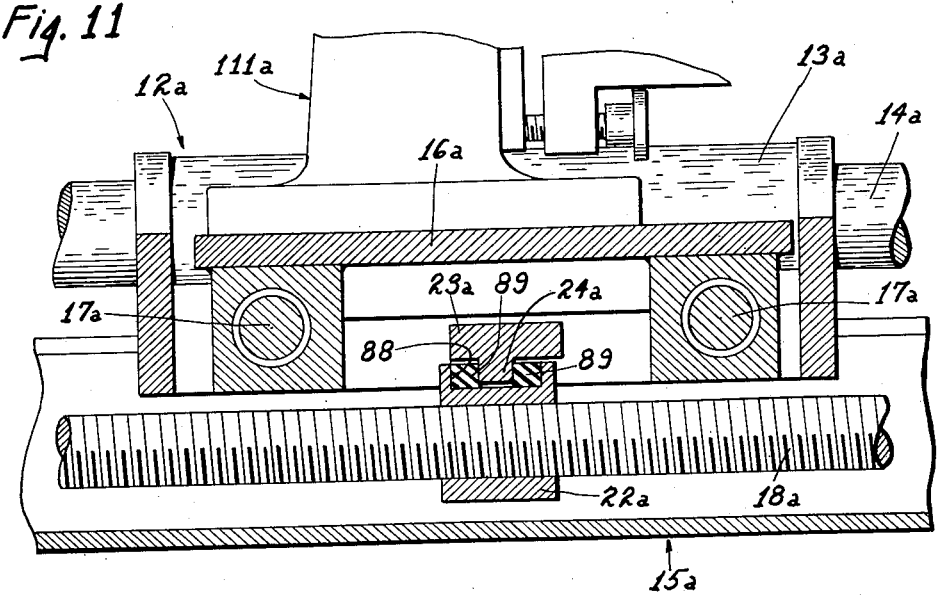
INVENTOR.
RUSSELL E. NORTHUP
BY
ATTORNEY Dec. 3, 1957  R. E. NORTHUP  2,814,803
JOINING APPARATUS
Filed Dec. 30, 1955  7 Sheets-Sheet 7

INVENTOR.
RUSSELL E. NORTHUP
BY
ATTORNEY

United States Patent Office 2,814,803
Patented Dec. 3, 1957

2,814,803

JOINING APPARATUS

Russell E. Northup, Salem, Ohio, assignor to The Herr Equipment Corporation, Warren, Ohio, a corporation of Ohio Application December 30, 1955, Serial No. 556,549

11 Claims. (Cl. 1—2)

The present invention relates to apparatus for joining material, more particularly to apparatus for joining, in overlapping relation, the trailing end of one portion of strip material with the leading end of another portion of strip material, and the principal object of the invention is to provide new and improved apparatus of the character described.

In many strip processing lines, the operation of initially threading the leading end of the strip through the line is a time-consuming task. This is particularly true when the lines perform complex operations on the strip and when they are relatively long. Under these circumstances, it is common practice to secure the leading end of a portion of strip material to be fed into the line to the trailing end of a portion of strip material already entered in the line. As will be understood, this will obviate the necessity of laboriously feeding the leading end of each portion of strip through the line since the trailing end of each portion of strip in the line will pull the next succeeding portion of strip therethrough.

Heretofore, various types of apparatus have been employed to secure the two portions of strip material together; however, many such apparatus have not been completely satisfactory since they required considerable attention and effort by the operator. Others required considerable maintenance and/or were excessively high in initial cost.

The present invention provides apparatus which is relatively low in initial cost, which is trouble-free in operation, and which requires little attention or effort by the operator. These and other advantages will readily become apparent from a study of the following description and from the appended drawings.

In the drawings accompanying this specification and forming a part of this application, there are shown, for purpose of illustration, embodiments which the invention may assume, and in these drawings:

Figure 2 is a reduced size top plan view of the embodiment shown in Figure 1,

Figure 1:
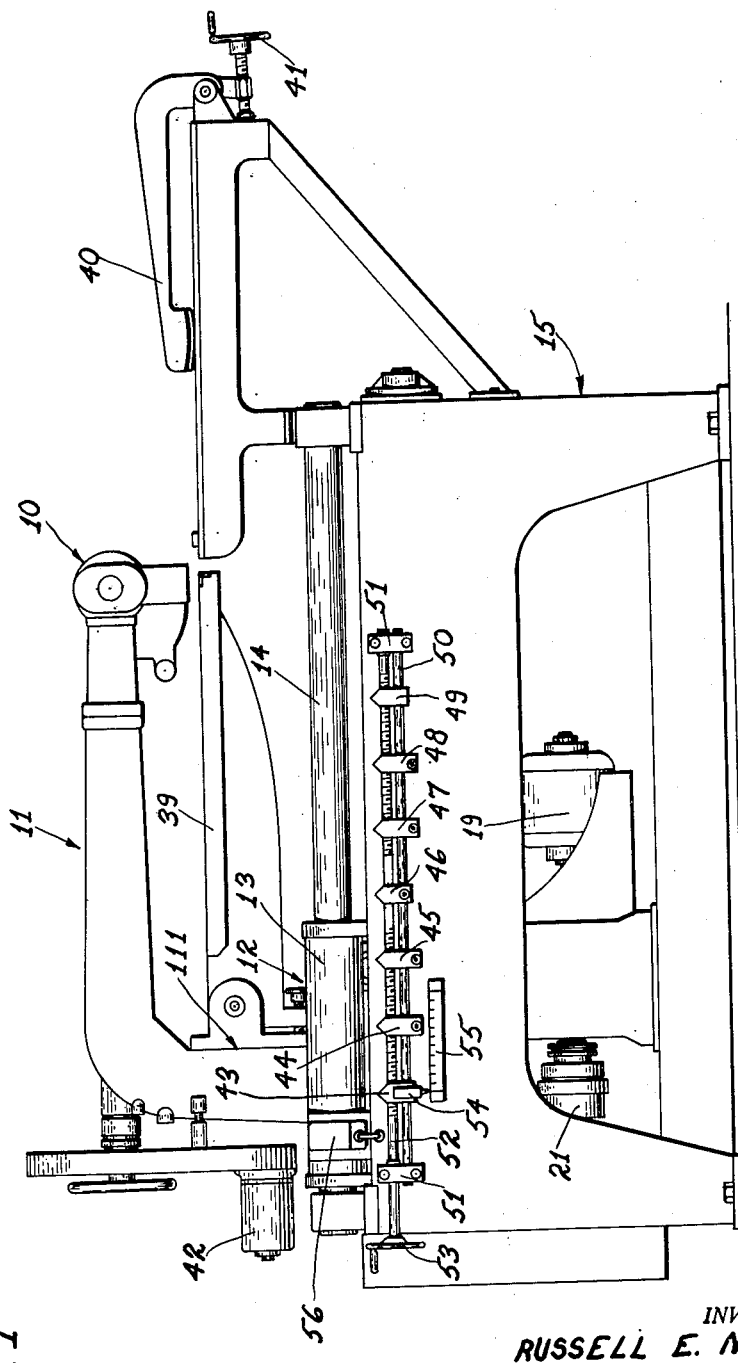
Figure 1 is a side elevational view of a preferred embodiment of the invention.
Figure 5:
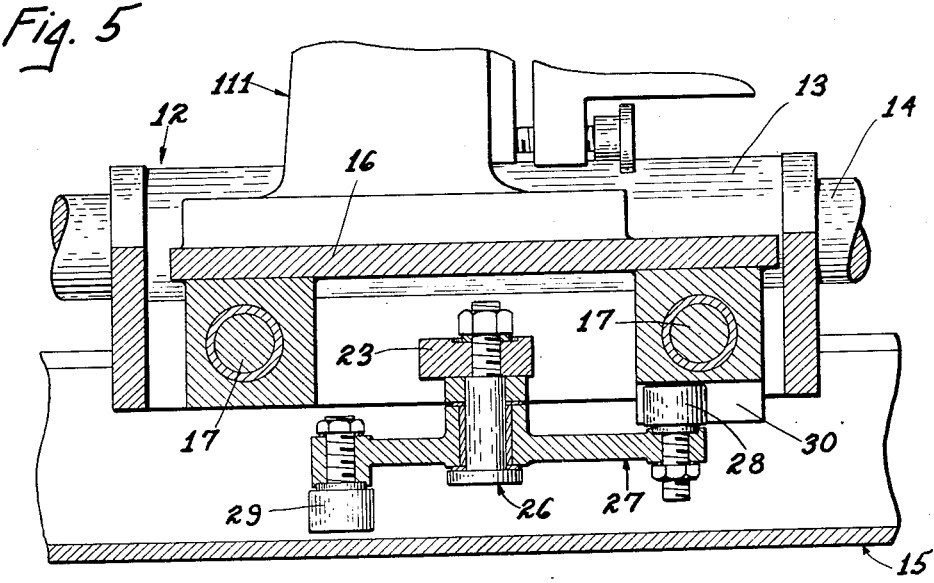
Figure 6:
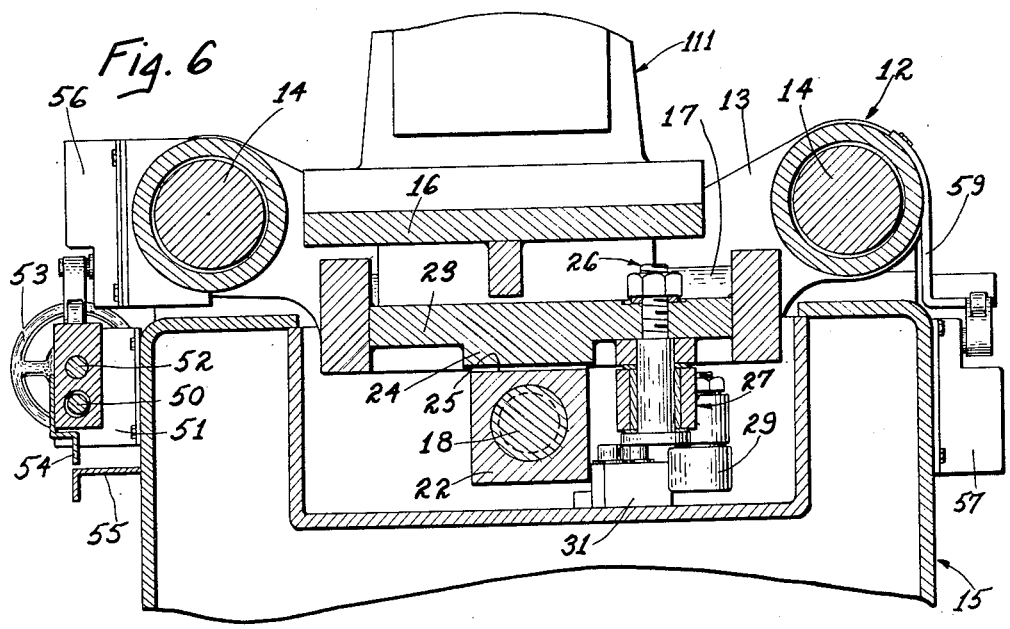
Figure 12:
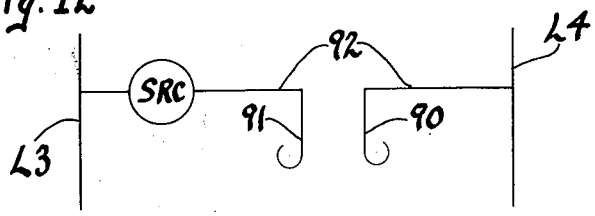

Figure 3 is a view similar to Figure 1, but showing much of the apparatus in longitudinal section, Figure 4 is an enlarged sectional view generally corresponding to the line 4—4 of Figure 3, Figure 5 is a sectional view generally corresponding to the line 5—5 of Figure 4, Figure 6 is a sectional view generally corresponding to the line 6—6 of Figure 4, Figure 7 is a fragmentary elevational view of the apparatus, but of the opposite side from that shown in Figure 1, Figure 8 is a diagrammatic plan view illustrating a portion of the apparatus and material which it is adapted to join, Figure 9 is a diagrammatic view illustrating the various controls presently employed to effect the desired operation of the embodiment shown in Figures 1 through 8, Figure 10 is a schematic view illustrating the manner in which the various controls are connected to achieve the desired operation, Figure 11 is a fragmentary view of a detail of another embodiment of the invention, and Figure 12 is a schematic view of additional controls.

The present invention is adapted to join overlapped portions of material by forming a plurality of spaced-apart spot connections. In the presently disclosed embodiments, the spot connections are formed by a commerically available stitcher or stapling device; however, it is to be understood that the spot connections may be formed of other means. For example, the spot connections may be formed by means of a spot welder or the like instead of the stapler herein illustrated.

As best seen in Figure 8, a stapler head is adapted to be moved across overlapped portions of material M and is adapted to periodically drive a staple S through the material to join it together. In the present embodiment, it is preferable to drive two rows of staples across the material, first row A and then row B. The stapler head is driven in the direction of the arrows from its full line position and along row A until it reaches the end of this row. Thereupon, it will be shifted transversely to align with row B and then reversed to move it in the direction of the arrows along row B. When row B is completed, the stitcher head will come to rest, in alignment with row A, to await its next period of operation in joining other material.

To provide for the foregoing, stapler head 10 is carried by an overhanging support arm 11 having a base 111 which is secured to a carriage means generally indicated at 12. Carriage means 12 comprises a first carriage 13 which is slidable longitudinally along spaced parallel slide bars 14, the latter being carried by a base 15 (see especially Figures 3 and 6). A second carriage 16 is slidable along transversely extending slide bars 17 carried by and movable with the first carriage 13. As will be clear, the stapler head is carried directly by carriage 16 and indirectly by carriage 13.

In the presently disclosed embodiment, the means for moving the stapler head 10 across the material comprises a screw 18 positioned beneath carriage means 12 and rotatably carried by base 15. Screw 18 is adapted to be rotated in one direction to move the stapler head from left to right (in the position of parts shown in Figures 1, 2, 3 and 8) and adapted to be rotated in the opposite direction to move the stapler head from right to left.

As best seen in Figure 3, a reversible drive motor 19 is carried by base 15 and is connected to screw 18 by means of a suitable chain and sprocket drive arrangement 20. For a purpose later to be disclosed, a suitable clutch 21 is interposed between motor 19 and screw 18 to interrupt driving engagement therebetween at certain times. Clutch 21 may be of any commercially available type; however, at the present time, is it preferred to employ a magnetic clutch which, when energized, connects motor 19 to screw 18 and which, when de-energized, disconnects the motor from the screw.

The connection between screw 18 and carriage means 12 includes a nut-like member 22 threaded on screw 18. A brace 23 extends across carriage 13 and has a depending lug 24 which closely fits within a groove 25 formed in the upper part of nut member 22 (see especially Figure 3). As screw 18 is rotated, nut 22 will travel therealong and, because of the interengagement between the nut and lug 24, carriage means 12 will be moved along slide bars 14.

To effect shifting of carriage 16 along slide bars 17, the following is presently employed: As best seen in Figure 5, but also shown in Figures 4 and 6, a stud 26 depends from and is secured to brace 23 of carriage 13. An intermediate portion of a lever 27 is pivotally carried by stud 26 and one end of lever 27 carries a roller 28 and the other end of the lever carries a roller 29. Roller 28 closely fits between the sides of a groove 30 formed in an adjoining portion of carriage 26, whereas roller 29 is engageable with spaced cams 31, 32 (see Figure 4) carried by base 15.

In the full line position of parts shown in Figure 4, carriage 13 is at the left end of its travel. Carriage 16 is at one of its extreme positions relative to slide bars 17 due to the fact that roller 29 has engaged cam 31 and shifted lever 27 (whose roller 28 is engaged in groove 30 of this carriage). When the carriages have been moved sufficiently to the right by rotation of screw 18 so that roller 29 engages cam 32, lever 27 will be shifted about its pivot in a counter-clockwise direction. Pivotal movement of lever 27 in this manner will shift carriage 16 along slide bars 17 to the dot dash line position shown. Carriage 16 will remain in this position until the carriages are carried to the left by means of screw 18 to the full line position wherein roller 29 has engaged cam 31 to rotate lever 27 in a clockwise direction to return carriage 16 along slide bars 17 to its full line position.

Any suitable means may be employed to insure that carriage 16 does not move from position along slide bars 17 prior to the time roller 29 engages one or the other of cams 31, 32. Such means may take the form of a device 33 carried by carriage 13 and providing a spring loaded plunger 34 which seats within respective recesses 35, 36 formed in carriage 16 to thereby resiliently hold carriage 16 in one or the other of its positions.

As best seen in Figures 1, 2 and 3, base 15 carries a table 37 which is adapted to support the material M to be joined. The table is slotted at 38 to pass an anvil member 39 which underlies arm 11 and which acts as a back-up member for stapler head 10 and which clinches the staples driven by the head. A pair of clamp arms 40 are pivotally carried by the table and are operated by means of a hand wheel 41. Turning hand wheel 41 in one direction causes the clamp arms to clamp the material tightly against table 37, whereas turning the hand wheel in the opposite direction causes the clamp arms to loosen the material.

As previously mentioned, rotation of screw 18 causes movement of the stapler head across the material. At certain predetermined positions of the stapler head, a clutch or the like will be actuated to cause a stapler drive motor 42 to effect operation of the stapler head to drive a staple through the material. Any suitable mechanism may be employed to trigger the aforementioned stapler clutch; however, it is presently preferred to trigger this clutch by means of a solenoid hereinafter referred to as the stapler trip solenoid. It is to be understood that only one staple will be driven with each energization of the trip solenoid, it being necessary to de-energize the solenoid and then reenergize it again before another staple will be driven.

The present invention utilizes cam-like trip members 43, 44, 45, 46, 47, 48 and 49 to effect operation of the stapler head at the proper time to drive a staple through the material. In the embodiments herein disclosed, the stapler head moves to the right and drives one row of seven staples and then returns, driving another row of seven staples. It is to be understood, however, that the number of driven staples herein disclosed is illustrative only and that the apparatus may be constructed to drive a greater or lesser number.

Trip members 43 through 49 are carried by a rod 50 secured at each end to the side of base 15 by means of brackets 51. Extending parallel with rod 50 and rotatably carried by brackets 51 is an adjusting screw 52 having threads of one hand at one end and threads of the opposite hand at the opposite end.

The end trip members 43, 49 are slidable along rod 50 and each is threadably engaged with a respective threaded portion of adjusting screw 52. This provides for simultaneous adjustment of members 43, 49 toward or away from each other simply by turning a hand wheel 53 secured to screw 52 to thereby accommodate various widths of material by properly positioning the end staples relative to the edges of the material. To facilitate adjusting end members 43, 49, member 43 may carry a pointer 54 which cooperates with a scale 55 having suitable indicia and secured to base 15 adjacent the pointer.

Trip members 44, 45 and 47, 48, positioned on opposite sides of the center trip member 46, do not threadably engage screw 52, but instead are adapted to be separately slid along rod 50 until the spacing between the members is approximately equal (if such is desired) and these members then are adapted to be clamped in place by suitable clamping screws or the like. For a purpose to be disclosed, carriage 13 carries a limit switch 56 (hereinafter referred to as the trip switch) having an actuator positioned for engagement with the above-described trip members.

Referring to Figure 7, a pair of limit switches 57, 58 are secured to base 15 and each has an actuator adapted to be engaged with respective abutments 59, 60 carried by carriage 13 when the latter is at the respective ends of its travel. Limit switch 57 (hereinafter referred to as the back limit switch) is adapted to be tripped by abutment 59 when carriage 13 is in its normal starting position shown in Figures 1, 2, 3 and 7, whereas limit switch 58 (hereinafter referred to as the forward limit switch) is adapted to be tripped by abutment 60 when carriage 13 has been moved along slide bars 14 to the left as viewed in Figure 7 and to the right as viewed in Figures 1, 2 and 3.

As best seen in Figure 9 and in addition to the previously mentioned trip switch 56 and the forward and back limit switches 58, 57, other electrical devices are employed to effect the desired operation of the embodiment of the invention thus far described. These devices include a start switch having normally open contacts 61, a stop switch having normally closed contacts 62, and a stapler control switch having contacts 63 and 64. When the stapler control switch is in the "on" position, contacts 63 will be closed and contacts 64 will be open. When the stapler control switch is in the "off" position, contacts 63 will be open and contacts 64 will be closed. Further included are solenoid relays 65, 66, 67, 68 and 69.

Solenoid relay 65 has a solenoid SRA and normally open contacts SRA–1, SRA–2, SRA–3, SRA–4 and SRA–5; relay 66 has a solenoid SRB and normally open contacts SRB–1 and SRB–2. Relays 65 and 66 are of the conventional type wherein energization of each relay's solenoid causes movement of all of the contacts carried by such relay from a normally open position to a closed position. De-energization of the solenoid restores the contacts to their normally open positions.

Relay 67 is of the time delay type having a solenoid TD and normally open contacts TD–1 and TD–2. When solenoid TD is energized, contacts TD–1 and TD–2 close after a predetermined length of time. When solenoid TD is de-energized, the contacts immediately return to their normally open positions.

Relay 68 is also of the time delay type having a solenoid 2TD and having normally open contacts 2TD–1. When solenoid 2TD is energized, contacts 2TD–1 close after a predetermined length of time. When solenoid 2TD is de-energized, the contacts immediately open.

Relay 69 is somewhat of a combination of the two types of relays hereinbefore disclosed. This relay has a solenoid 3TD and normally open contacts 3TD–1 and normally closed contacts 3TD–2. When solenoid 3TD is energized, contacts 3TD–1 will close after a predetermined length of time, whereas contacts 3TD–2 will open immediately. When solenoid 3TD is de-energized, contacts 3TD–1 and 3TD–2 will immediately return to their normal respective open and closed positions.

Trip switch 56 has normally open contacts 70 and normally closed contacts 71, and the forward limit switch 58 has normally open contacts 72. The back limit switch 57 has normally closed contacts 73; however, since the actuator of this switch is engaged by abutment 59 in the indicated position of parts, contacts 73 are being held open.

Figure 10:
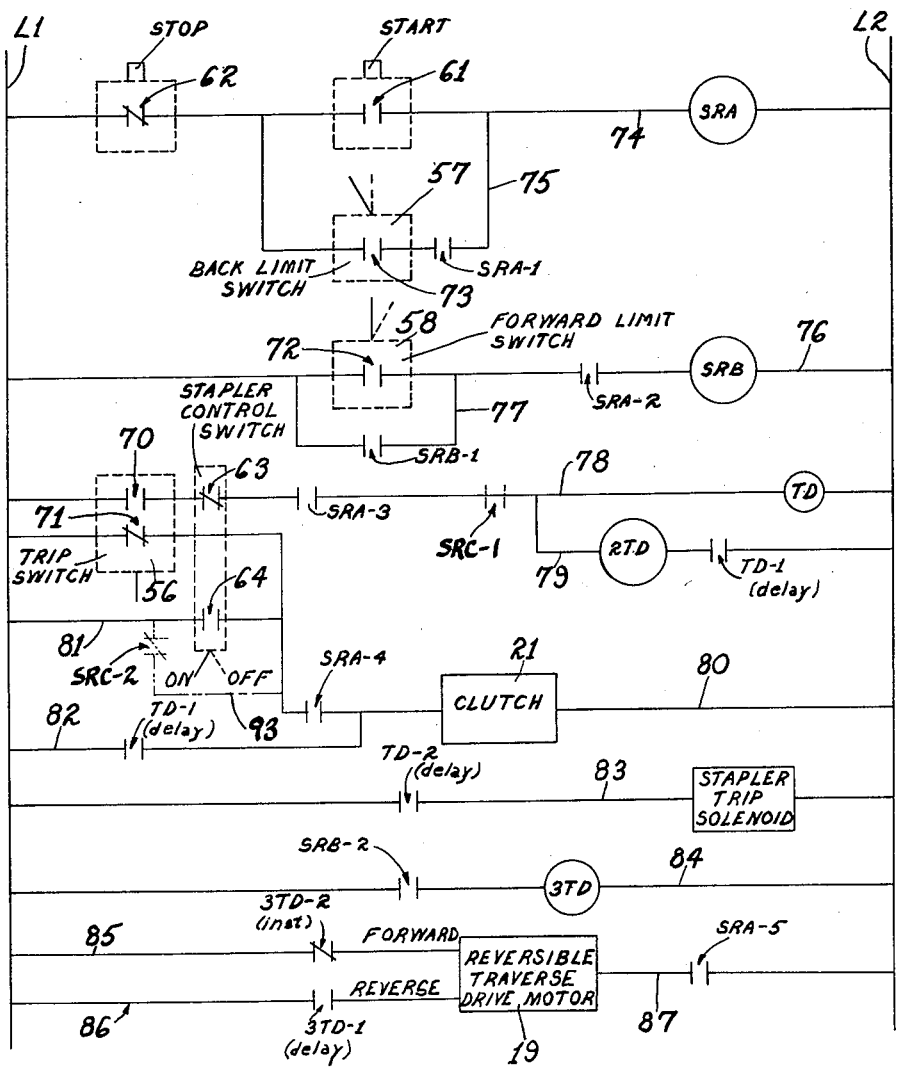

With reference to schematic diagram Figure 10, solenoid SRA of relay 65 is connected across power line L1 and L2 by means of a circuit 74 in which the normally open contacts 61 of the start switch and the normally closed contacts 62 of the stop switch are interposed. A circuit 75 shunts around contacts 61 of the start switch, contacts SRA–1 of relay 65 and contacts 73 of the back limit switch 57 being interposed in this circuit.

Solenoid SRB of relay 66 is connected across the power lines by means of a circuit 76 in which are interposed contacts 72 of the forward limit switch 58 and contacts SRA–2 of relay 65. A circuit 77 having contacts SRB–1 of relay 66 interposed therein shunts around contacts 72 of the forward limit switch.

Solenoid TD of time delay relay 67 is connected across the power lines by means of a circuit 78 in which are interposed contacts 70 of trip switch 56, contacts 63 of the stapler control switch, and contacts SRA–3 of relay 65. A branch circuit 79 leads from circuit 78, as shown, to power line L2 and contains solenoid 2TD of time delay relay 69 and contacts TD–1 of time delay relay 67.

The hereinbefore mentioned clutch 21 is connected across the power lines by means of a circuit 80 in which are interposed contacts 71 of trip switch 56 and contacts SRA–4 of relay 65. Circuits 81 and 82 shunt around contacts 71 of the trip switch and connect to circuit 80, as shown, contacts 64 of the stapler control switch being interposed in circuit 81 and contacts 2TD–1 of time delay relay 68 being interposed in circuit 82.

The hereinbefore mentioned stapler trip solenoid is connected across the power lines by means of a circuit 83 in which are interposed contacts TD–2 of time delay relay 67, solenoid 3TD of time delay relay 69 being connected across the power lines by means of a circuit 84 in which are interposed contacts SRB–2 of relay 66.

The reversible traverse drive motor 19 is connected across the power lines by means of a forward circuit 85, a reverse circuit 86, and a common circuit 87. Interposed in circuit 85 are the instantaneous contacts 3TD–2 of time delay relay 69 and interposed in circuit 86 are the delay contacts 3TD–1 of this relay. Interposed in the common circuit 87 are contacts SRA–5 of relay 65.

With the parts in the initial position best shown in Figures 1, 2 and 3, the operator will clamp the material to be joined to table 37 so that the adjoining ends of the material are disposed in overlapping relation (see Figure 8). Note that none of the circuits across the power lines L1 and L2 is completed at this stage (see Figure 10).

After securing the material in position as before described and assuming that current is being fed to power lines L1 and L2, the operator will depress the button of the start switch to close contacts 61 thereof. Current will now flow in circuit 74 and solenoid SRA will be energized to close contacts SRA–1, SRA–2, SRA–3, SRA–4 and SRA–5. Closing of contacts SRA–1 will not complete circuit 75 since contacts 73 of the back limit switch are being held open by abutment 59. Closing of contacts SRA–2 in circuit 76 will not complete this circuit since contacts 72 of the forward limit switch are open. Closing of contacts SRA–3 in circuit 78 will not complete this circuit since contacts 70 of the trip switch are open. Closing of contacts SRA–4 in circuit 80 will energize and engage clutch 21 and closing of contacts SRA–5 in circuit 87 will energize the drive motor through forward circuit 85.

With drive motor 19 rotating in the proper direction and with clutch 21 engaged, screw 18 will be rotated to drive the carriage means 12, and the parts carried thereby, in a direction toward the material. As soon as abutment 59 (see Figure 7) moves away from the back limit switch, the latter's actuator will move to the dot dash position to close contacts 73 and effect current flow in circuit 75. The operator may now release the start switch button and open contacts 61; solenoid SRA, however, remains energized through circuit 75 which shunts around the start switch.

Movement of stapler head 10, carried by carriage means 12, will continue until the trip switch engages trip member 43 to close contacts 70 and open contacts 71. The opening of contacts 71 interrupts circuit 80 and de-energizes clutch 21 to interrupt movement of the carriage means. The closing of contacts 70 energizes solenoid TD in circuit 78 and, after a predetermined time interval (such interval insuring that the carriage means has come to rest), contacts TD–1 and TD–2 will close. Closing of contacts TD–2 in circuit 83 will trigger the stapler trip solenoid and cause the stapler head 10 to drive one staple through the material. Closing of contacts TD–1 in branch circuit 79 will energize solenoid 2TD. After a predetermined time interval (such interval insuring that the stapler head has completed its staple driving operation), contacts 2TD–1 in shunt circuit 82 will close to re-energize and engage clutch 21 so that motor 19 will once again drive the stapler head from left to right (as viewed in Figures 1 and 8).

As the trip switch moves away from trip member 43, contacts 70 of the trip switch will open and de-energize solenoids TD and 2TD to thus open the contacts controlled by these solenoids. Simultaneously with the opening of contacts 70, contacts 71 will close to maintain current flow through clutch 21 even though circuit 82 is now open. The stapler head will continue to move in the direction described until the trip switch engages trip member 44 to thereupon initiate another stapling cycle. From the foregoing, it will be clear that a staple will be driven each time the trip switch engages a trip member.

After the trip switch has passed trip member 49 (this trip member triggering the last staple in row A), continued movement of the carriage means will carry roller 29 of lever 27 into engagement with cam 32 to thus shift carriage 16 (and the stapler head carried thereby) along slide bars 17 until the stapler head aligns with row B. At this time, the carriage means will have moved sufficiently so that abutment 60 moves the actuator of forward limit switch 58 to its dot dash position. This will energize solenoid SRB in circuit 76 and close contacts SRB–1 in shunt circuit 77 and contacts SRB–2 in circuit 84.

The closing of contacts SRB–2 will energize solenoid 3TD and instantaneously open the normally closed contacts 3TD–2 in circuit 85 to thereupon stop drive motor 19. After a predetermined time interval (such interval insuring that the drive motor has come to rest), delay contacts 3TD–1 in circuit 86 will close. This will reverse the direction of rotation of the drive motor and thereby move the carriage means in the opposite direction. As the carriage means moves away from the forward limit switch, its contacts 72 will open; however, since contacts SRB–1 in shunt circuit 77 are closed, current will continue to flow through solenoid SRB to maintain it energized.

In a manner similar to that heretofore described, the trip switch will cause a staple to be driven each time the switch passes over a respective trip member. After the trip switch has passed trip member 43 (this member triggering the last staple in row B), continued movement of the carriage means will carry roller 29 of lever 27 into engagement with cam 31 to thus return carriage 16 to the position shown in full lines in Figure 4 wherein the stapler head will be aligned with row A once again. At this time, abutment 59 will move the actuator of the back limit switch to its full line position to open contacts 73 in circuit 75. This will de-energize solenoid SRA and open contacts SRA–1 in circuit 75, contacts SRA–2 in circuit 76, contacts SRA–3 in circuit 78, contacts SRA–4 in circuit 80, and contacts SRA–5 in circuit 87.

The opening of contacts SRA–2 in circuit 76 will de-energize solenoid SRB which will in turn open contacts SRB–1 in shunt circuit 77 and contacts SRB–2 in circuit 84. Opening of circuit 84 will de-energize solenoid 3TD which in turn will close contacts 3TD–2 in forward circuit 85 of the drive motor and open contacts 3TD–1 in reverse circuit 86 of this motor. Since contacts SRA–5 in common motor circuit 87 are open, this motor will come to rest. The opening of contacts SRA–4 in circuit 80 will de-energize the clutch and the circuits will once again be open as shown in Figure 10.

The operator may now free the joined material from the apparatus by operating hand wheel 41 to release clamp arms 40. When other material is to be joined, the foregoing will be repeated.

It is an important feature that once operation of the stapler has been initiated, no further attention is required by the operator until the joining operation has been completed. Moreover, if desired, clamping arms 40 could be operated by means of a fluid cylinder or the like which could be interconnected with the stapler so as to automatically release the material upon completion of the joining operation.

From a study of the schematic diagram, it will be understood that operation of the device may be interrupted at any stage of operation by momentarily pressing the button of the stop switch. Pressing the start button will start the device again at the stage of operation at which it was stopped.

At certain times it may be desirable to move the stitcher head to a forward position where it will be more readily accessible for maintenance or the like. At such times, of course, it would not be desirable to interrupt movement of the head to drive a staple each time the trip switch passes one of the trip members. Accordingly, at such times, the stapler control switch can be moved to its off position whereupon closing of contacts 61 of the start switch will cause the stapler head to move across the material as usual but without interruption and without driving any staples. When the head reaches the desired position, momentary pressure on the stop button will stop movement of the head until the start button is once again pressed to effect resumption of movement of the head.

The embodiment fragmentarily illustrated in Figure 11 is similar to the one heretofore disclosed; accordingly, similar parts are identified with the same reference characters but with the suffix "a" added. In this embodiment, nut member 22a has a groove 88 formed therein for receiving depending lug 24a of brace 23a. For a purpose to be disclosed, this groove differs from groove 25 in that it is materially wider than lug 24a. Interposed between each side of groove 88 and a respective adjoining side of lug 24a is a block of rubber 89 or other resilient material. This construction cushions the drive between the traveling nut member and the stapler head since the driving force is transmitted through one or the other of the blocks 89 depending upon the direction of movement of the nut.

In the embodiment illustrated in Figure 11, it is not necessary to provide a clutch to interrupt the traversing drive of the stapler head each time a staple is driven since the blocks provide a resilient, lost-motion connection. Means similar to that heretofore described may be used to trip the stapler head and drive a staple, shaft 18a, driven by a suitable motor, continuing to rotate uninterruptedly while the staple is being driven.

Traversing movement of the stapler head across the material will be interrupted, during the very short interval while the staple is being driven through the material, because of interengagement between the staple (being propelled by the stapler head) and the material. Blocks 89, being resilient, permit the stapler head to momentarily stop while screw 18a continues to rotate and nut member 22a continues to travel along the screw. The travel of the nut 22a during this interval merely compresses one of the resilient blocks. After a staple is driven and the stapler head is once again free to move across the material, the compressed block will spring back to its original position (shown in Figure 11).

Since the embodiment of the invention illustrated in Figure 11 does not require interruption of the traversing drive while a staple is driven, the control circuit of this embodiment may be considerably simplified over that heretofore disclosed. This, it will be understood, is of considerable advantage.

While the use of resilient blocks 89 of rubber or the like is disclosed, it will readily be apparent that springs or the like could be employed to serve the same function of providing a resilient, lost-motion connection in the traversing drive of the stapler head.

The embodiments herein disclosed employ trip members 43 through 49 to effect operation of the stapler head at the proper time to drive a staple through the material. However, if desired, these trip members and the associated trip switch could be replaced by a suitable timing device which would trigger the stapler at predetermined time intervals while the latter is traveling across the material.

This timing device may be so connected that it will begin to operate upon traversing movement of the stapler head across the material and may carry contacts which correspond to contacts 70, 71 of the trip switch. After a predetermined time interval (which time interval would correspond to a definite relationship between the stapler head and the material), the timing device would actuate its contacts and trigger the stapler head in the same manner as the trip switch hereinbefore disclosed. The stapler head would continue its movement across the material and the timing device would, after each time interval, trigger the stapler head to drive a staple. The operation would continue until the stapler head has traversed across the material and returned to its starting place.

When joining relatively narrow material, it is sometimes undesirable to drive the same number of staples therein as is driven in wide material. This may be accomplished by reducing the number of impulses given to the stapler trip solenoid in a joining cycle of operation. In the event a construction having trip members 43—49 is employed, certain of these members could be removed so as to reduce the number of impulses given to the stapler trip solenoid. This, however, is not completely satisfactory because of the additional adjustments necessary. Accordingly, it is contemplated that the following construction may be employed to obviate the necessity of any adjustments whatsoever to vary the number of staples driven in accordance with the width of the material.

As seen in Figure 3, a pair of spring-like, contact members or feelers 90, 91 may be carried by stapler head 10. These feelers will be positioned in spaced relation, one on each side of the head, as shown, and each will extend downwardly to engage with the material clamped to table 37. Referring now to Figure 12, feelers 90, 91 are in a circuit 92 which extends across a pair of low voltage lines L3 and L4. Interposed in circuit 92 is a solenoid SRC which actuates normally open contacts SRC–1 in circuit 78 (see Figure 10) and normally closed contacts SRC-2 in a circuit 93 which shunts around contacts 64 of the stapler control switch.

Assuming that relatively narrow material is clamped in place on table 37, the operator will initiate a joining cycle, as before, by depressing the start button to thus cause the stapler head to begin its traversing movement. Since solenoid SRC is deenergized, contacts SRC-1 will be open and contacts SRC-2 will be closed. This will prevent triggering of the stapler trip solenoid and interruption of the stapler head drive by the trip switch (or by the hereinbefore mentioned timing device if such is employed) until such time as feelers 90, 91 are bridged by the material to be joined to cause flow of current in circuit 92.

Note that the stapler head must carry both feelers into engagement with the material before solenoid SRC is energized to close contacts SRC-1 and open contacts SRC-2. With contacts SRC-1 closed and contacts SRC-2 open, the trip switch will then operate to trigger the stapler trip solenoid to drive a staple and momentarily interrupt traversing movement of the stapler head in the manner heretofore disclosed.

Upon movement of the stapler head sufficiently to disengage one of the feelers 90, 91 from the material, solenoid SRC will be de-energized and the contacts controlled thereby will return to their normal positions whereby the trip switch will be rendered inoperative to trigger the stapler trip solenoid. The stapler head will continue its traversing movement, without driving staples, and ultimately reach the end of its travel and reverse to return to its starting position as before disclosed. As reverse movement of the stapler head carries feelers 90, 91 into re-engagement with the material, the second row of staples will be driven. As soon as the reverse movement of the stapler head carries one of the feelers out of engagement with the material, triggering of the stapler head will cease while the stapler head returns to its starting position.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Apparatus for joining overlapped portions of material, comprising joining means operable to form spaced-apart spot connections between the portions of material, drive means to effect relative traversing movement between the material and said joining means, and a resiliently biased lost motion connection interposed between said drive means and said joining means to permit uninterrupted operation of said drive means while said joining means intermittently stops to form said spot connections.

2. Apparatus for joining overlapped portions of material, comprising joining means having a cycle of operation which forms a spot connection between the portions of material, means to effect relative traversing movement between the material and said joining means, means to intermittently interrupt said movement and effect a cycle of operation of said joining means to form a spot connection, and means responsive to the cycle of operation of said joining means to effect resumption of said relative movement following termination of a cycle of operation of said joining means.

3. Apparatus for joining overlapped portions of material, comprising joining means having a cycle of operation which forms a spot connection between the portions of material, means to effect relative traversing movement between the material and said joining means, means to intermittently interrupt said movement when said joining means and the material are disposed in selected position relative to each other and to effect a cycle of operation of said joining means to form a spot connection, and means responsive to the cycle of operation of said joining means to effect resumption of said relative movement following termination of a cycle of operation of said joining means.

4. Apparatus for joining overlapped portions of material, comprising joining means operable to form spaced-apart spot connections between the overlapped portions of material, clamp means to hold the respective material portions in fixed overlapped relation with one edge of the material adjacent said joining means, means to effect relative movement of said joining means across the material along a first path from said one edge of the material toward the latter's opposite edge and to effect relative movement of said joining means along a second path and in the opposite direction from a position adjacent the opposite edge of the material to the latter's one edge, means to intermittently interrupt said relative movement and effect a cycle of operation of said joining means to form a spot connection, means responsive to the cycle of operation of said joining means to effect resumption of said relative movement following termination of a cycle of operation of said joining means, and means to effect relative shifting between the material and said joining means to shift the latter from one path to the other when said joining means is adjacent the opposite edge of the material.

5. Apparatus for joining overlapped portions of material, comprising clamp means to hold the respective material portions in fixed overlapped relation, a carriage mounted for movement both longitudinally of the overlapped material portions and transversely thereof, joining means carried by said carriage and operable to form spaced-apart spot connections between the overlapped material portions, means to effect movement of said carriage longitudinally of the overlapped material portions to move said joining means along a first path across the material from a first position adjacent one edge of the material to a second position adjacent the opposite edge thereof and to effect return movement of said carriage in the opposite direction to move said joining means along a second path across the material from said second position to said first position, means to effect shifting of said carriage transversely of the overlapped material portions to shift said joining means from one path to the other when said joining means is at one of said positions, means to intermittently interrupt the longitudinal movement of said carriage in each direction and to effect a cycle of operation of said joining means to form a spot connection, and means responsive to the cycle of operation of said joining means to effect resumption of said longitudinal movement following termination of a cycle of operation of said joining means.

6. Apparatus for joining overlapped portions of material by driving two spaced-apart rows of staples therethrough, comprising clamp means to hold the respective material portions in fixed overlapped relation, a carriage mounted for movement both longitudinally of the overlapped material portions and transversely thereof, a stapler head carried by said carriage and operable to drive a plurality of staples in spaced-apart relation through said overlapped material portions, means to effect movement of said carriage longitudinally of the overlapped material portions to move said stapler head along a first path coincident with one of the rows of staples across the material from a first position adjacent one edge of the material to a second position adjacent the opposite edge thereof and to effect return movement of said carriage in the opposite direction to move said stapler head along a second path coincident with the other row of staples across the material from said second position to said first position, means to effect shifting of said carriage transversely of the overlapped material portions to shift said stapler head from one path to the other when said stapler head is at one of said positions, means to intermittently interrupt the longitudinal movement of said carriage in each direction and to effect a cycle of operation of said stapler head to drive a staple, and means responsive to the cycle of operation of said stapler head to effect resumption of said longitudinal movement following termination of a cycle of operation of said stapler head.

7. Apparatus for joining overlapped portions of material, comprising joining means operable to form spaced-apart spot connections between the portions, means to relatively move said joining means and the material portions along a first path and thereafter relatively shift said joining means and the portions in a direction angular to said first path and then relatively move said joining means and the portions along a second path spaced from said first path, means for intermittently interrupting relative movement of said joining means and the material portions during travel along said first and second paths, and means for actuating said joining means to effect a spot connection between the overlapped material portions during interruption of relative movement.

8. Apparatus for joining overlapped portions of material, comprising joining means operable to form spaced-apart spot connections between the portions of material, means for moving said joining means in spaced paths to and fro across such portions, means for intermittently interrupting movement of said joining means along said paths, and means for actuating said joining means to effect a spot connection between the overlapped portions during interruption of relative movement.

9. Apparatus for joining overlapped portions of material, comprising joining means operable to form spaced-apart spot connections between the portions of material, means for moving said joining means in spaced paths to and fro across such portions, and a lost motion connection between said moving means and said joining means to permit uninterrupted operation of said moving means while said joining means intermittently stops to form said spot connections.

10. Apparatus as specified in claim 2 wherein the means effecting said relative traversing movement includes clutch means; wherein the means intermittently interrupting such traversing movement disengages said clutch means to provide for such interrupted movement; and wherein the last mentioned means in claim 2 is coordinated with the cycle of operations of said joining means to re-engage said clutch means and effect resumption of said relative traversing movement following termination of a cycle of operation of said joining means.

11. Apparatus as specified in claim 2 wherein the means effecting relative traversing movement comprises drive means for effecting traversing movement of said joining means relative to the material and clutch means interposed between said drive means and said joining means; wherein the means intermittently interrupting such traversing movement comprises means for disengaging said clutch means to provide for interruption of the traversing movement of said joining means and time delay means activated upon disengagement of said clutch means to effect a cycle of operation of said joining means to form a spot connection a sufficient time interval following clutch disengagement to insure termination of the traversing movement of said joining means; and wherein the last mentioned means of claim 2 is coordinated with the cycle of operations of said clutch means to re-engage said clutch means and effect resumption of the traversing movement of said joining means following termination of a cycle of operation of said joining means.

References Cited in the file of this patent

UNITED STATES PATENTS 1,704,517  Russell _____ Mar. 5, 1929